(12) United States Patent
Bunya et al.

(10) Patent No.: US 6,742,794 B2
(45) Date of Patent: Jun. 1, 2004

(54) STEERING DAMPER SYSTEM

(75) Inventors: Osamu Bunya, Saitama (JP); Takehiko Nanri, Saitama (JP); Kanji Hayashi, Saitama (JP); Takeshi Wakabayashi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/321,696

(22) Filed: Dec. 18, 2002

(65) Prior Publication Data

US 2003/0132598 A1 Jul. 17, 2003

(30) Foreign Application Priority Data

Dec. 28, 2001 (JP) .................................... 2001-400627

(51) Int. Cl.[7] ............................................. B62K 21/12
(52) U.S. Cl. ........................ 280/272; 280/276; 188/306
(58) Field of Search ........................ 280/272, 274–276, 280/279, 283; 180/219; 74/551.1; 188/306–310

(56) References Cited

U.S. PATENT DOCUMENTS

| | | | | |
|---|---|---|---|---|
| 3,698,521 A | * | 10/1972 | Taylor | 188/306 |
| 3,726,368 A | * | 4/1973 | Taylor | 188/316 |
| 4,776,514 A | * | 10/1988 | Johnstone et al. | 236/78 R |
| 4,846,317 A | * | 7/1989 | Hudgens | 188/266.5 |
| 5,305,858 A | * | 4/1994 | Haga et al. | 188/271 |
| 5,988,329 A | * | 11/1999 | Evans et al. | 188/296 |
| 6,145,637 A | * | 11/2000 | Hopey | 188/306 |

FOREIGN PATENT DOCUMENTS

| | | |
|---|---|---|
| JP | 63-064888 A | 3/1988 |
| JP | 7-074023 B2 | 8/1995 |
| JP | 2593461 B2 | 12/1996 |

* cited by examiner

Primary Examiner—Lesley D. Morris
Assistant Examiner—L. Lum
(74) Attorney, Agent, or Firm—Birch, Stewart, Kolasch & Birch, LLP (57) ABSTRACT

A liquid pressure type steering damper system for generating a damping force for preventing a handle from being swung due to a kick-back upon a disturbance wherein the generation of the damping force is nonlinear so that the steering angle would not be enlarged so much even if the kick-back becomes greater. A liquid pressure type steering damper is provided with a restriction passage for a working liquid and a solenoid-type control valve for varying the passage sectional area of the restriction passage. A needle portion is formed at the tip end of a plunger constituting the solenoid valve and is made to advance and retract in a restriction portion connected to a bypass passage. An annular gap passage is formed between the needle portion and the inside wall of the restriction portion so that, when the needle portion advances or retracts in proportion to the steering speed of a front wheel steering system, the clearance area of the gap passage is varied in the manner of a quadric curve in relation to the stroke amount of the needle portion, whereby the generation of the damping force is rapidly increased in the manner of a quadric curve. In addition, an upper limit of the damping force is restricted by an electromagnetic force of the solenoid valve.

20 Claims, 7 Drawing Sheets

STEERING DAMPER SYSTEM

CROSS-REFERENCE TO RELATED APPLICATIONS

The present nonprovisional application claims priority under 35 USC 119 to Japanese Patent Application No. 2001-400627 filed on Dec. 28, 2001 the entire contents thereof is hereby incorporated by reference.

BACKGROUND OF THE INVENTION

1. Field of the Invention

The present invention relates to a liquid pressure type steering damper system for vehicles which is preferable for saddle ride type vehicles such as motorcycles and the like and is used for restraining the swing of a handle during operation.

2. Description of Background Art

In order to prevent the handle from being swung due to a kick-back upon a disturbance, liquid pressure type steering damper systems which generate a damping force against the swing have been known, for example, as disclosed in Japanese Patent No. 2593461. In addition, systems in which the damping force is variable so that the damping force is generated only when required and a needless damping force is not generated in other situations have also been known; for example, a system which controls the damping force based on steering angle and operating velocity as disclosed in Japanese Patent Laid-open No. Sho 63-64888. In addition, a system which controls the damping force based on variations in the load on the front wheel is disclosed in Japanese Patent Publication No. Hei 7-74023.

In the damping force variable type steering dampers according to the above-mentioned related art examples, a sensor quantity detected and a damping force quantity generated, which are used for controlling the damping force, are considered to be in a linear relationship. However, with such a linear relationship, the front wheel steering system would steer more largely before the generation of a required damping force as the kick-back to be generated due to a disturbance is greater. Therefore, it is desired to prevent a large kick-back by generating a damping force swiftly and appropriately, without causing a large extent of steering.

In addition, if the generation of a needlessly great damping force is allowed, the steering damper is required to have a needlessly high strength for enduring the excessively large damping force. Therefore, it is also desired that an excessively large damping force is not generated. Accordingly, it is an object of the present invention to realize the above-mentioned requests.

SUMMARY AND OBJECTS OF THE INVENTION

In order to solve the above-mentioned problems, the present invention provides a steering damper system wherein a steering damper system of the liquid pressure type in which a damping force is exerted on a front wheel steering system provided at a front portion of a vehicle body and which includes a control valve for making the damping force variable with the control valve including a valve body advancing and retracting in a passage for the working liquid and wherein the valve body has a thickness varying uniformly along the longitudinal direction thereof. The advancing/retracting motions of the valve body make the clearance area of a gap passage formed around the valve body variable with the clearance area being varied nonlinearly in relation to the advancing/retracting stroke of the valve body. The damping force generated at the gap passage is increased in a manner of a quadric curve in relation to variations in the stroke.

The present invention includes the cross-sectional shape of the gap passage that is in an annular shape.

The present invention provides a control valve that includes an upper limit restricting means for restricting the generation of the damping force to be not more than a predetermined upper limit.

The present invention includes a control valve that is a solenoid valve, and the upper limit restriction of the damping force is effected by an electromagnetic force of the solenoid valve.

According to the present invention, the variation of the clearance area of the gap passage formed around the valve body is varied nonlinearly in relation to the stroke amount of the valve body which advances and retracts, whereby the damping force generated at the gap passage is increased in the manner of a quadric curve in relation to the variations in the stroke. Therefore, since the damping force is increased rapidly as the kick-back generated is greater, a great kick-back can be effectively prevented by generating the damping force swiftly and appropriately, without causing the front wheel steering system to steer to a large extent.

According to the present invention, the gap passage is annular, so that the clearance area varies in the manner of a square in relation to the variation in the radius of the gap passage which is proportional to the stroke amount of the valve body attendant on the advancing/retracting motions of the valve body. Therefore, the variation of the clearance area in the manner of a quadric curve mentioned above can be realized easily and with a comparatively simple structure because it suffices that the restriction passage and the valve body are formed to be circular in cross section.

According to the present invention, the control valve comprises the upper limit restricting means, so that the generation of the damping force can be restricted to a required level even when the damping force increases rapidly in the manner of a quadric curve. Therefore, it is unnecessary to provide the steering damper with a needlessly high strength.

According to the present invention, the control valve is a solenoid valve, whereby it is ensured that even if a damping force greater than the electromagnetic force of the solenoid valve tends to be generated, the generation of an excessively large damping force is hampered because the solenoid valve is opened by the liquid pressure. Therefore, the upper limit restricting means can be composed with a simple structure in which the control valve is simply a solenoid valve. Accordingly, it is unnecessary to separately provide a special upper limit restricting means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
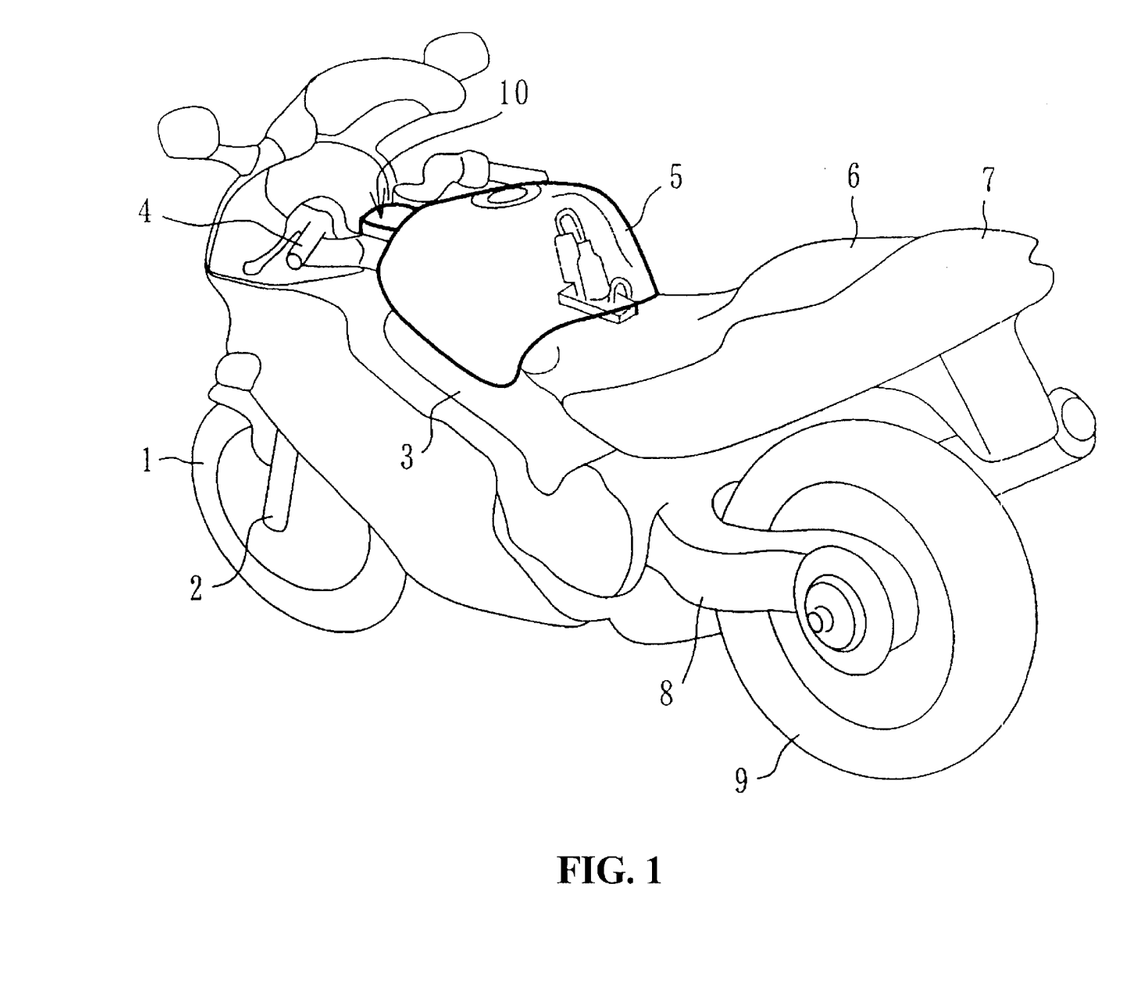
FIG. 1 is a perspective view showing a motorcycle to which the present embodiment is applied.

A first embodiment will be described based on the drawings. In FIG. 1, an upper portion of a front fork 2 for supporting a front wheel 1 at the lower end thereof is connected to a front portion of a vehicle body frame 3, and is turnable by a handle 4. A fuel tank 5 is supported on the vehicle body frame 3. A seat 6 is provided together with a rear cowl 7, a rear swing arm 8, and a rear wheel 9.

Figure 2:
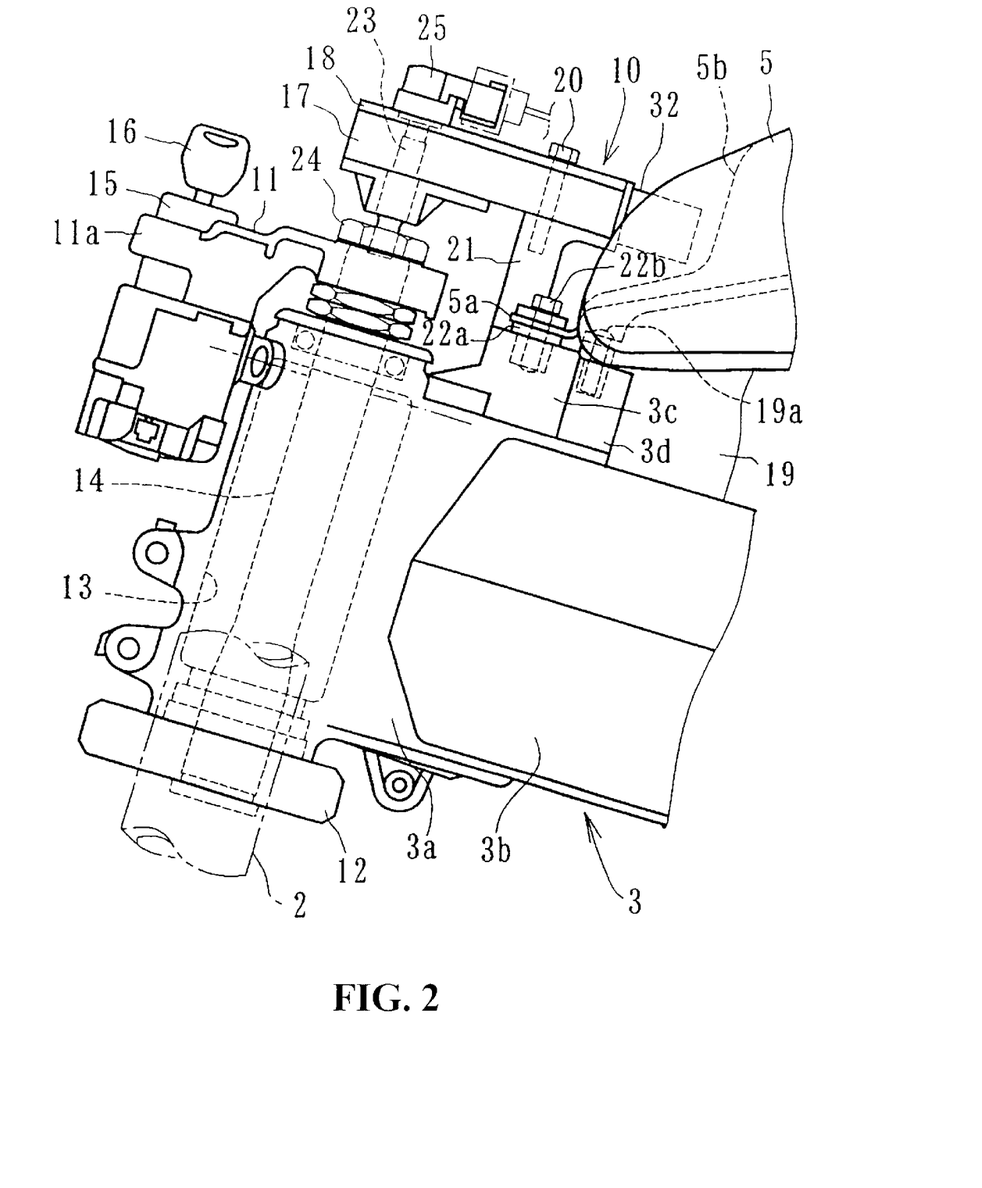
FIG. 2 is a side view of the structure of a front portion of a vehicle body at which a steering damper is provided.
Figure 3:
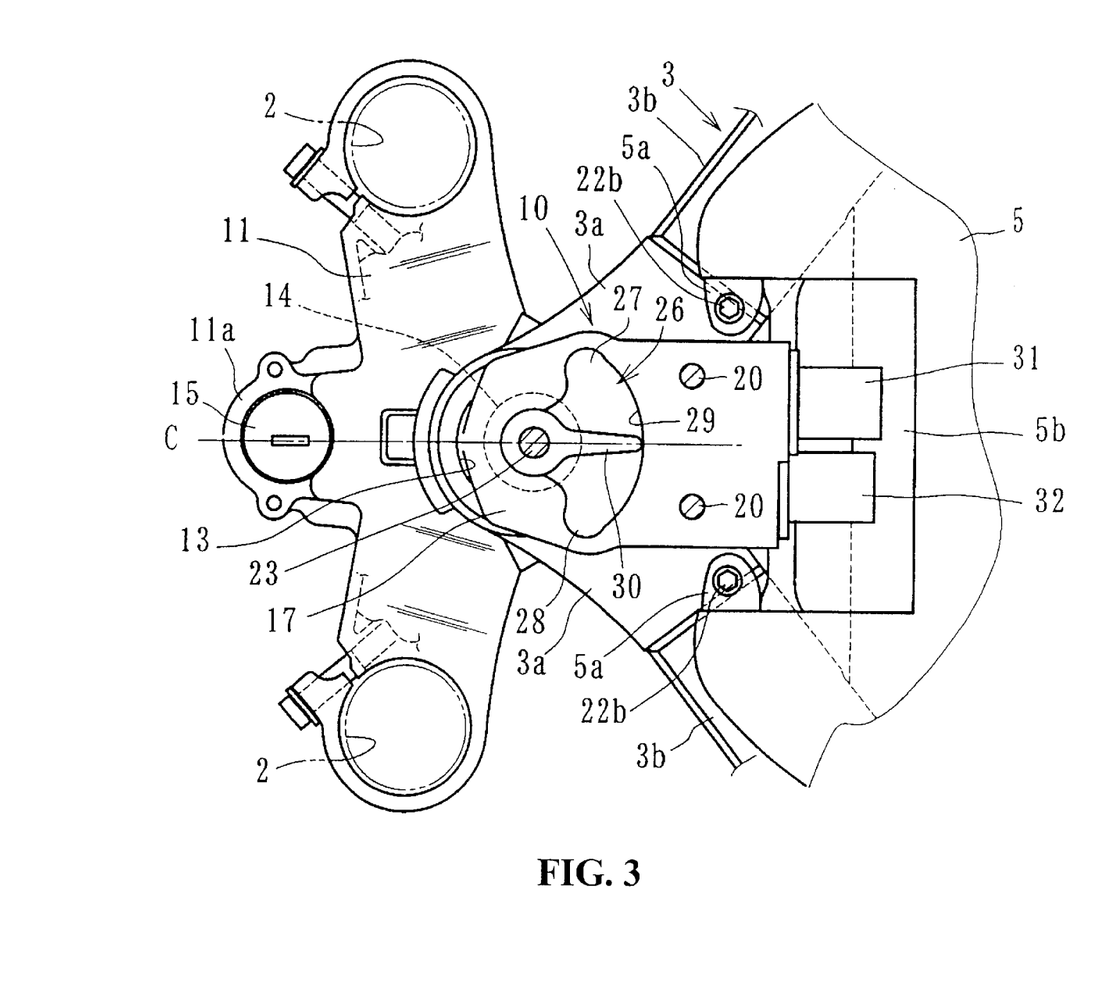
FIG. 3 is a plan view of the same.

As shown in FIGS. 2 and 3, the steering damper 10 is disposed on the upper side of a top bridge 11 to which the handle 4 is fitted. The top bridge 11 is shaft-supported on a head portion 3a which is a front end portion of the vehicle body frame 3. The top bridge 11 constitutes a pair with a bottom bridge 12 provided on the lower side, so as to integrally clamp a steering shaft 14, which is supported by a head pipe 13, from the upper and lower sides. The top bridge 11, the bottom bridge 12 and the steering shaft 14 are turned as one body.

The head pipe 13 in the present embodiment is a cylindrical portion integrally formed in the vertical direction at the center of a front portion of the head portion 3a. It should be noted that the head pipe 13 may be a known one which is preliminarily formed of a pipe member separate from the vehicle body frame and is unified with the front end portion of the vehicle body frame by welding or the like. The steering damper 10 is arranged to be elongate in the front-rear direction on the upper side of the head portion 3a, ranging from the upper side to the rear side of the head pipe 13 along the center C (FIG. 3) of the vehicle body.

Respective upper portions of a left-right pair of portions of the front fork 2 are supported on the top bridge 11 and the bottom bridge 12. The head pipe 13 is a pipe-like portion formed integrally with the head portion 3a of the vehicle body frame 3. The vehicle body frame 3 comprises the head portion 3a and main frame portions 3b extending in a pair from the left and right of a rear end portion of the head portion 3a to the left and right rear sides (FIG. 3). A stay 11a projecting integrally in a forward direction is provided at the center of a front portion of the top bridge 11. A main switch 15, integral with a handle lock, is supported on the stay 11a, and operations such as turning ON/OFF and unlocking are conducted through a key 16.

The steering damper system 10 in the present embodiment is a liquid pressure type damper for preventing kick-back, and comprises a main body portion 17 and a cover 18 (FIG. 2). The rear portion side of the steering damper 10 is fastened by a bolt 20 to a boss 21 formed integrally with and projecting upwardly from a top surface of the head portion 3a of the vehicle body frame 3 in the vicinity of the head pipe 13. At this time, the main body portion 17 and the cover 18 are co-fastened integrally. The boss 21 is preliminarily provided with a nut portion.

Raised stepped portions 3c are provided on the top surface of rear portions of the head portion 3a on the left and right sides of the boss 21 with stays 5a formed at the left and right of a front portion of the fuel tank 5 being fitted there with bolts 22b in a vibration-proof manner through rubber gaskets 22a. As shown in FIG. 3, the stays 5a project to the vehicle body center side from both sides of a front end portion of a recessed portion 5b provided at the center of a front portion of the fuel tank 5 in the state of being opened forwardly and upwardly and are overlapped onto the stepped portions 3c in the vicinity of the portions where the front end portions of the main frame portions 3b are connected.

Again in FIG. 2, an air cleaner 19 is disposed on the lower side of the fuel tank 5, and a front end portion thereof is fitted to a fitting portion 3d at the rear end of the head portion 3a by a bolt 19a, at a position on the lower side of the recessed portion 5b. The fitting portion 3d is a portion which is continually projected from the stepped portions 3c to the rear side and to the lower side of the recessed portion 5b.

A shaft 23 pierces through a front portion of the steering damper 10 with its axis directed vertically in FIG. 2 and is supported so as to be turnable with respect to the steering damper 10. The lower end of the shaft 23 projects downwardly from the main body portion 18 of the steering damper 10, is fitted to the upper end of the steering shaft 14, and is connected so as to be rotatable as one body. The shaft 23 and the steering shaft 14 are disposed coaxially.

A steering nut 24 is provided which fastens the upper end of the steering shaft 14 to the top bridge 11. The lower end of the shaft 23 pierces through a hole formed at a central portion of the steering nut 24.

The upper portion side of the shaft 23 pierces upwardly through the cover 18, and its upper end portion enters into a rotational angle sensor 25 fixed onto the cover 18. The rotational angle sensor 25 is a known one that uses electrical resistance or the like for detecting a rotational angle relative to the turning of the shaft 23 and the side of the main body 17 of the steering damper 10, thereby detecting a rotational angle of the steering shaft 14 rotated as one body with the shaft 23, and for outputting the detection signal to a control unit (described later) as sensor quantity for calculating the steering speed.

The steering damper 10 in FIG. 3 shows the structure on the side of the main body portion 17 exclusive of the cover 18. A roughly fan-shaped liquid chamber 26 is formed by a recessed portion provided in the main body portion 17, and the interior of the liquid chamber is partitioned into a right liquid chamber 27 and a left liquid chamber 28. A vane 30 is provided for forming a partition wall partitioning the left and right liquid chambers from each other with one end thereof being integrated with the shaft 23 for turning as one body with the shaft 23. A control valve 31 is provided together with a control unit 32. The control valve 31 and the control unit 32 are provided to project outwardly at a rear end portion of the steering damper 10, and are contained in the recessed portion 5b of the fuel tank 5 together with a rear end portion of the steering damper 10.

A steering lock 15 and the steering shaft 14 and the shaft 23 are located roughly on the same straight line with respect to the center line C of the vehicle body, the steering lock 15 and the control valve 31 and the control unit 32 are located on the opposite sides in the front-rear direction with respect to the steering damper 10. The control valve 31 and the control unit 32 are located on the left and right sides with respect to the center line C of the vehicle body with the control valve 31 and the control unit 32 being fitted to rear portions of the main body portion 17.

Figure 4:
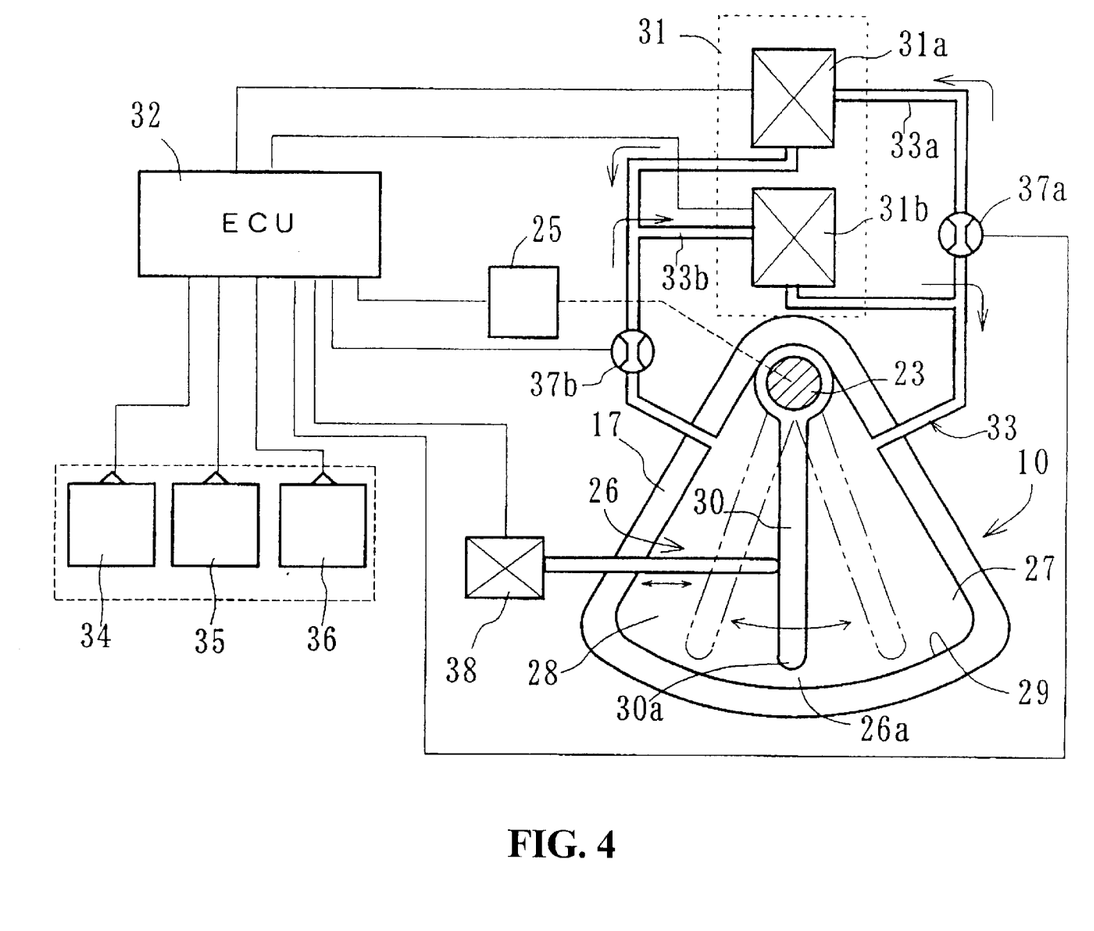
FIG. 4 is an illustration of general structure of the steering damper.

FIG. 4 schematically shows the structure of the steering damper 10, in which the interior of the steering damper 10 is provided with the fan-shaped liquid chamber 26 broadened to the rear side of the vehicle body (downwardly in the FIG. 4). The shaft 23 is located at a position corresponding to the pivot of the fan with the inside of the liquid chamber 26 being divided into the right liquid chamber 27 and the left liquid chamber 28 by the partition wall 30 extending rearwardly in a vane form integrally from the shaft 23. The steering damper 10 is of a vane type in which an oscillating piston is the partition wall 30.

The tip end 30a of the partition wall 30 defines, between itself and the inside surface of an arch-shaped wall 29 of the liquid chamber 26, a little gap 26a for communication between the right liquid chamber 27 and the left liquid chamber 28. A non-compressible working liquid such as oil is sealed in the right liquid chamber 27 and the left liquid chamber 28, which are in communication with each other through the gap 26a and are mutually connected by a bypass passage 33.

Therefore, when the front wheel steering system is turned due to oscillational turning of the front wheel to the left or right direction and the partition wall 30 is turned (see imaginary lines in the FIG. 4) in conjunction with this, if the turning of the partition wall 30 is comparatively slow, the working liquid moves from the liquid chamber reduced in volume to the liquid chamber enlarged in volume on the opposite side through the gap 26a, thereby conforming to the change in volume. In this case, a small damping force is generated or only a slight damping force is generated at the gap 26a.

On the other hand, when the turning of the partition wall 30 is rapid, the amount of the working liquid to be moved exceeds the amount allowed to pass through the gap 26a, so that the working liquid moves from the liquid chamber reduced in volume to the liquid chamber on the other side through the bypass passage 33. The control valve 31 is provided at an intermediate portion of the bypass passage 33.

The control valve 31 includes a variable restriction passage for generating a damping force. Therefore, by varying the passage sectional area of the restriction passage, it is possible to restrict the working liquid movement of the working liquid attendant on the variation in volume between the left and right liquid chambers, thereby generating a variable damping force.

The control valve 31, in the present embodiment includes a first control valve 31a for regulating the damping force of the working liquid flowing from the right liquid chamber 27 toward the left liquid chamber 28, and a second control valve 31b for regulating the damping force of the working liquid flowing reversely from the left liquid chamber 28 toward the right liquid chamber 27. Here, a single control valve may be used in place of the first control valve 31a and the second control valve 31b which are separate members.

The bypass passage 33 also includes a first passage 33a passing through the first control valve 31a, and a second passage 33b passing through the second control valve 31b; a first flow rate sensor 37a is provided on the input side of the first control valve 31a in the first passage 33a, and a second flow rate sensor 37b is provided on the input side of the second control valve 31b in the second passage 33b. In addition, a stroke sensor 38 for detecting the turning amount of the partition wall 30 is provided in the steering damper 10.

These flow rate sensors 37a, 37b detect the rotating direction of the steering shaft 14, and also detect the flow rate and flow velocity. The stroke sensor 38 is for detecting the rotation amount of the steering shaft 14, and can be auxiliarily used also for calculating the steering speed of the steering shaft 14. The detection values of the sensors can be utilized as sensor quantities related to the magnitude of the kick-back. The detection results are outputted to the control unit 32 to be used for a damping force control as required.

Figure 5:
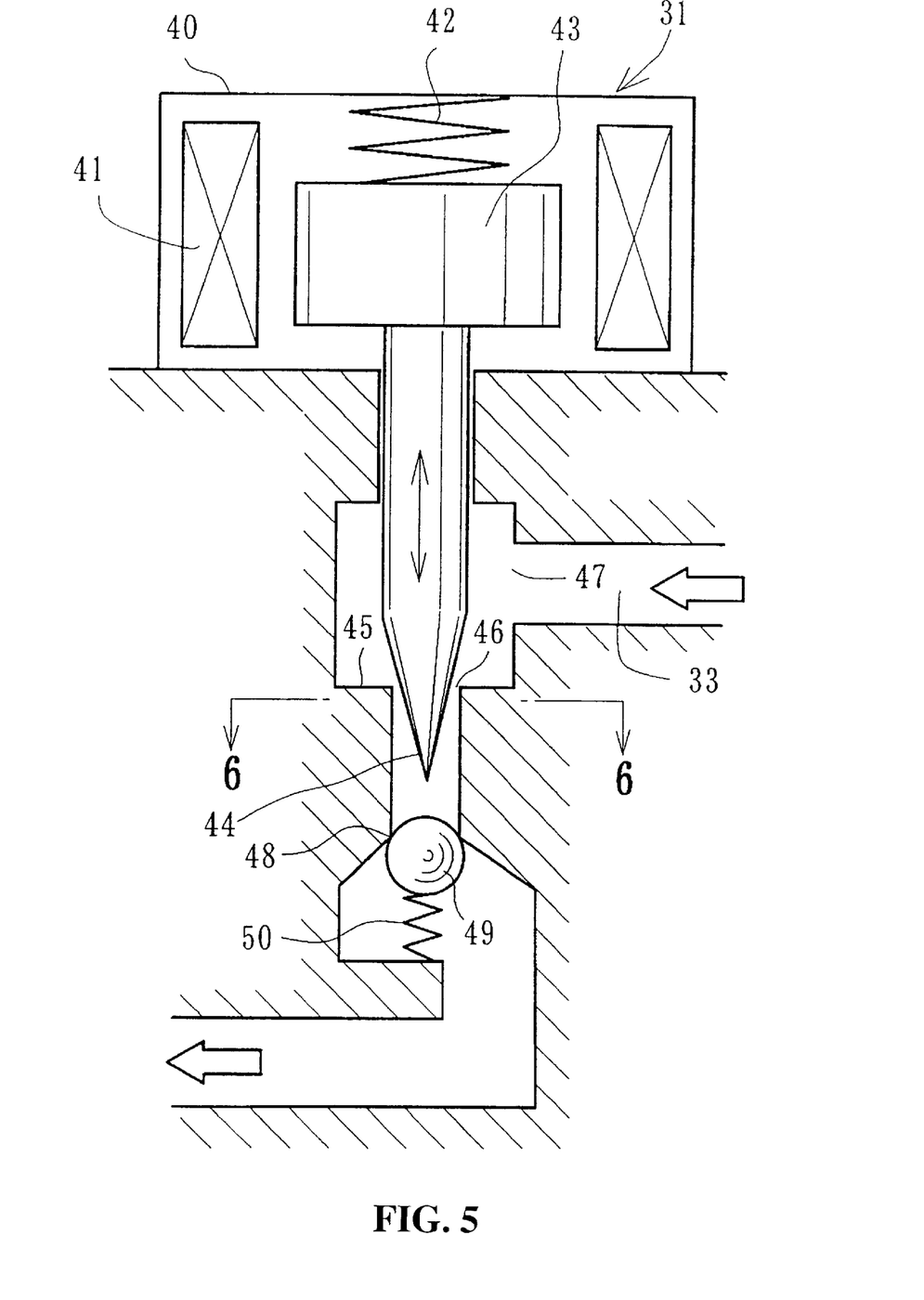
FIG. 5 is a sectional view of a solenoid valve.

FIG. 5 shows the structure of the control valve 31. Since the first control valve 31a and the second control valve 31b have the same structure, the control valves will be described as a common control valve 31 without discriminating one from the other. The control valve 31 has a structure in which a coil 41, a spring 42 and a plunger 43 are contained in a case 40, and a roughly conically shaped needle portion 44, formed at one end of the plunger 43, advances and retracts in a restriction portion 45 in the vertical direction in the FIG. 5. The needle portion 44 has a thickness that gradually increases (or gradually decreases) along its axial direction. The restriction portion 45 is a portion for restricting a part of the passage sectional area of the bypass passage 33.

The control valve 31 is constituted as a linear solenoid comprising a driving portion which moves rectilinearly with a stroke proportional to the sensor quantity. The plunger 43 is moved downwardly in the FIG. 5 against the spring 42, according to an electromagnetic force by excitation of the coil 41, so as to vary the passage sectional area of the gap passage 46 formed between the inside wall of the restriction portion 45 and the periphery of the needle portion 44. Thus, the magnitude of the damping force generated by the working liquid passing through the gap passage 46 is varied. When the coil 41 is demagnetized, the plunger 43 is urged by the spring 42 to move upwardly in FIG. 5, whereby the restriction portion 45 is opened, resulting in no generation of a damping force.

Figure 6:
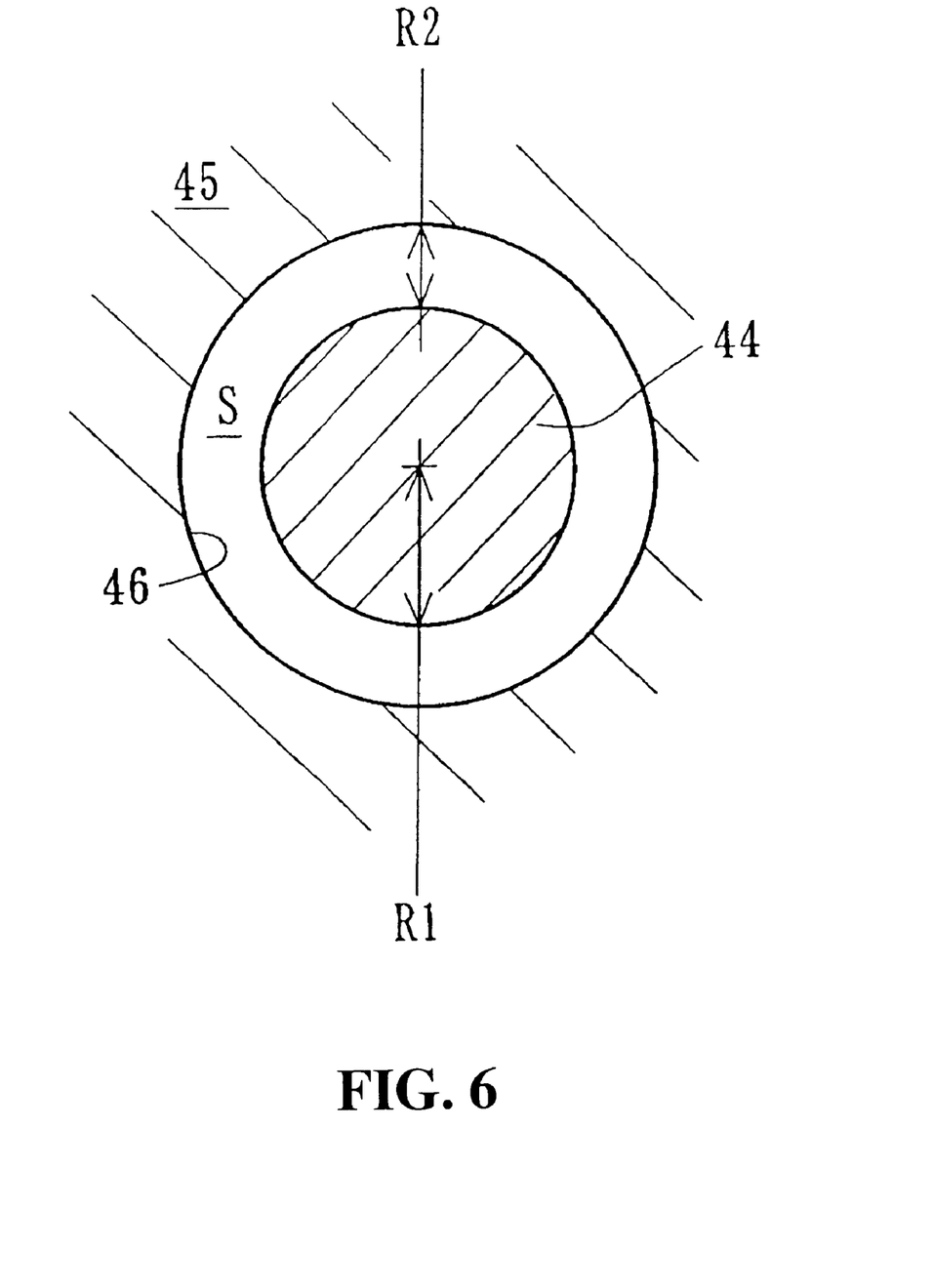
FIG. 6 is a sectional view taken along line 6—6 of FIG. 5.

As is clear from the cross-sections with respect to the axial directions of the needle portion 44 and the restriction portion 45 shown in FIG. 6, the sections of the needle portion 44 and the restriction portion 45 are circular, and the gap passage 46 formed therebetween is annular. Symbol R1 denotes the radius of the needle portion 44 at a certain section, R2 denotes the radius of the gap passage 46, and S denotes the clearance area corresponding to the passage sectional area of the gap passage 46, which show respective values in the same arbitrary section (in FIG. 6, the section corresponding to line 6—6 of FIG. 5).

The clearance area S is variable according to advancing/retracting motions of the plunger 43, and the radius R1 of the needle portion 44 in a certain section linearly varies proportionally to the stroke d at the time of advancing/retracting of the plunger 43. Attendant on this, the radius R2 of the gap passage 46 varies inversely proportionally to the radius R1, since the inside diameter of the restriction portion 45 is constant.

As a result, since the clearance area S is proportional to the square of the radius R2, the variation of the clearance area S varies in a square mode with respect to the variation of the radius R1 of the needle portion 44. Accordingly, the restriction amount of the bypass passage 33 is varied in a square mode with respect to the stroke amount of the needle portion 44, and the generation of the damping force is varied in the manner of a nonlinear quadric curve.

Again with respect to FIG. 5, an inlet 47 of the restriction portion 45 is provided together with an outlet 48. The outlet 48 is opened and closed by a check valve including a ball 49 and a check spring 50. The outlet 48 is closed when the liquid pressure at the outlet 48 is less than a predetermined value. The outlet 48 is opened when the liquid pressure is not less than the predetermined value, thereby allowing the working liquid to flow from the inlet 47 to the outlet 48. The check valve is provided in each of the first control valve 31a and the second control valve 31b (See FIG. 4), and the check valve provided on the side of the first control valve 31a permits the flow of the working liquid only from the right liquid chamber 27 to the side of the left liquid chamber 28 and prevents a reverse flow. The check valve on the side of the second control valve 31b functions in the reverse manner.

An upper limit is set to the electromagnetic force generated by the coil 41 so that the magnitude of the damping force generated at the gap passage 46 will reach an upper limit of the required level when the electromagnetic force is at its upper limit. Namely, when the steering speed becomes conspicuously high and a damping force greater than the damping force upper limit is to be generated, the damping force overcomes the electromagnetic force so as to move the needle portion 44 upwardly in the FIG. 5, thereby enlarging the clearance area S of the gap passage 46, resulting in the damping force not being increased further. Therefore, the damping force in excess of the required level is cut off.

Next, the method of controlling the damping force will be described. In FIG. 4, when the steering shaft is turned due to a disturbance, the shaft 23 integral with the steering shaft is turned. If the partition wall 30 is turned to the side of the left liquid chamber 28, the control unit 32 calculates the steering speed by differentiating the rotational angle detected by the rotational angle sensor 25, detects the rotating direction based on the detection results of the second flow rate sensor 37b and the stroke sensor 38, and, based on this data, gives to the second control valve 31b an instruction for restricting the second passage 33b by a predetermined amount corresponding to the steering speed. In the case where the partition wall 30 is turned in the reverse direction, also, an instruction for restriction is similarly given to the first control valve 31a.

This instruction is for causing the plunger 43 of the control valve 31 shown in FIG. 5 to advance or retract by the amount calculated by the control unit 32; the plunger 43 is lowered so as to restrict the gap passage 46 at the restriction portion 45. By this, the clearance area S of the gap passage 46 is varied to generate a required damping force, thereby inhibiting the turning of the partition wall 30, and a damping force is exerted on the turning of the shaft 23 and the steering shaft 14 which are integral with the partition wall 30, whereby the swing of the handle due to kick-back is damped.

At this time, since the gap passage 46 is an annular passage and the needle portion 44 is roughly conically shaped with the thickness gradually increased (or gradually decreased) along its axial direction, when the needle portion 44 advances or retracts with a stroke amount d proportional to the steering speed, the radius $R_1$ of the needle portion 44 in an arbitrary section of the restriction portion 45 varies in proportion to the stroke amount d, and the radius $R_2$ of the gap passage 46 is inversely proportional to the variation of the radius $R_1$.

In addition, the clearance area S is proportional to the square of the radius $R_2$ of the gap passage 46, and the amount of the damping force generated is inversely proportional to the size of the clearance area S, since, the variation of the damping force generated is proportional to the square of the variation of the stroke of the needle portion 44, and, hence, to the square of the variation of the steering speed. Therefore, the amount of the damping force generated increases rapidly as the steering speed increases.

Figure 7:
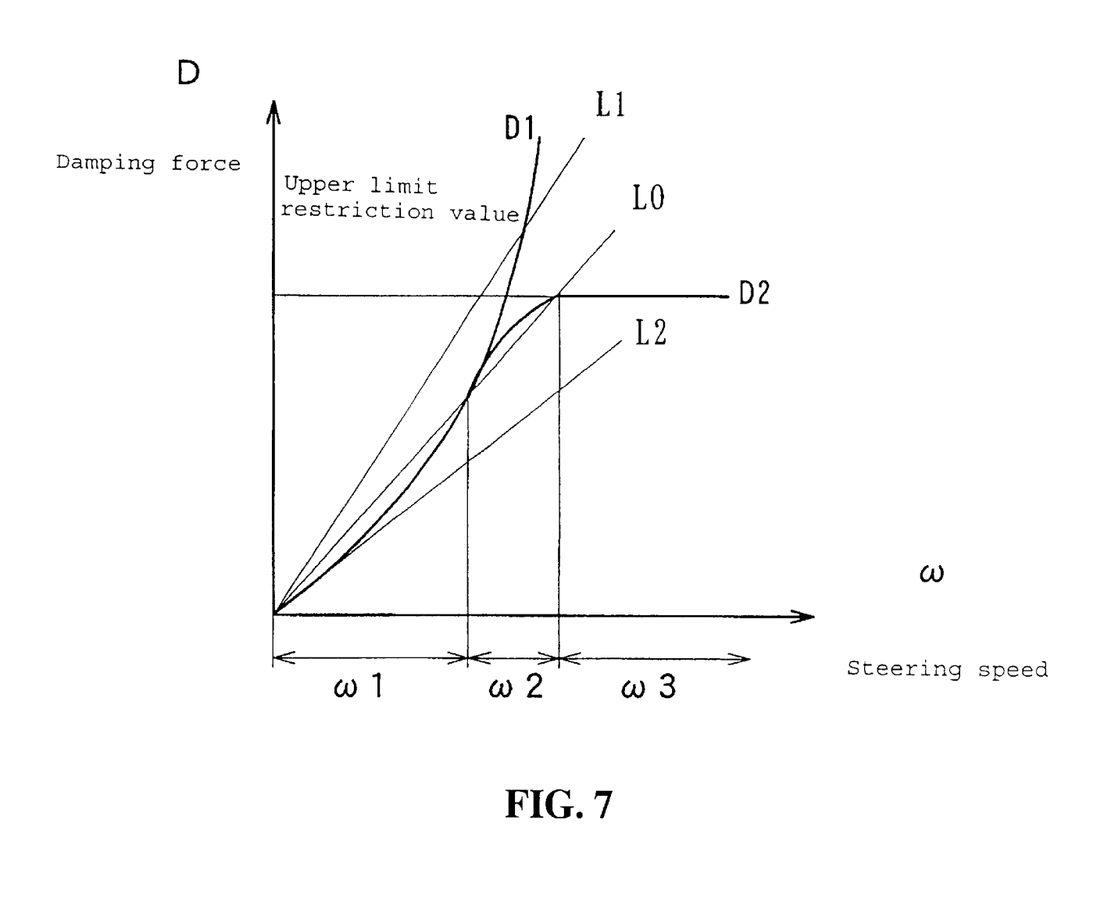
FIG. 7 is a graph showing actions based on steering speed.

As a result, as shown in a damping force curve D1 in FIG. 7, the amount of the damping force generated in response to an increase of the steering speed increases rapidly in the manner of a nonlinear quadric curve. In the graph, the axis of abscissas represents the steering speed ω, and the axis of ordinates represents the damping force D. The damping force curve D1 is an ideal damping force curve according to the present invention without the upper limit restriction, and a damping force curve D2 is a damping force curve with the upper limit restriction by the solenoid valve in the present embodiment.

In addition, L0 is a standard line in the case where the damping force is varied linearly in relation to the steering speed ω. L1 is an upper limit line, and L2 is a lower limit line, which respectively show an upper limit value and a lower limit value of the damping force required at a certain steering speed. The value on the standard line L0 in the axial direction is an intermediate value between the upper limit value and the lower limit value. ω1 is a rider operation region in which the damping force is set low for allowing smooth rider operations, while ω2 is a disturbance convergence region in which it is necessary to positively converge the disturbance by enhancing the damping force. ω3 is an upper limit restriction region in which the needlessly excess portion of the damping force is to be cut off.

As shown in this FIG. 7, in the cases of both the damping force curve D1 and the damping force curve D2, the damping force increases in the manner of a quadric curve as the steering speed ω increases. Here, it is ensured with consideration that in the rider operation region ω1, the damping force varies below the standard line L0 so as to allow smooth rider operations. Also, it is ensured with consideration that in the disturbance convergence region ω2, on the contrary, the damping force varies above the standard line L0 so as to effectively converge the disturbance.

Thus, the generation of the damping force is controlled based on the steering speed, and, therefore, it is possible to predict the magnitude of the kick-back and to generate an appropriate damping force. In this case, although it is considered that the steering angle in the front wheel steering system would become larger as the kick-back to be generated by a disturbance becomes greater, the required damping force can be generated before the actual steering angle becomes too large.

Moreover, since the damping force varies nonlinearly in relation to the steering speed ω, the generation of the damping force in response to the steering speed is effected as follows. Namely, in the range ω2 where a greater damping force is necessary, the damping force above the standard line L0 is increased rapidly, whereby kick-back can be effectively prevented. In the rider operation region ω1, the generation of the damping force is somewhat suppressed to be below the standard line L0, whereby the priority can be given to rider operability. Accordingly, it is possible to achieve an optimal control of the generation of the damping force according to the actual operating conditions.

Moreover, when the intersection between the damping force curve D1 which is a quadric curve and the standard line L0 which is a straight line is set at the boundary between the rider operation region ω1 and the disturbance convergence region ω2, by adjusting the coefficient of the second order or the like in the damping force curve D1 which is a quadric curve, it is possible to easily realize the above-mentioned correction for ensuring that the ratio of generation of the damping force in relation to the standard line L0 in the rider operation region ω1 is different from that in the disturbance convergence region ω2.

In the upper limit restriction region ω3, there is a difference between the damping force curve D1 and the damping force curve D2, and the damping force curve D1 increases the generation of the damping force continuously following to ω2. On the other hand, in the damping force curve D2, the generation of the damping force reaches to a sufficient upper limit, and where it is unnecessary to increase the generation of the damping force even if the steering speed ω increases more, a further increase of the damping force is restrained, and the damping force is maintained to be constant on roughly the same level.

Concretely, the maximum output of the electromagnetic force at the control valve 31 in FIG. 5 is set at an extent for conforming to the upper limit of the damping force. In this way, when the steering speed ω goes into ω3 so that a damping force in excess of the upper limit might be generated, the liquid pressure due to the damping force generated at the restriction portion 45 overcomes the electromagnetic force, so that the plunger 43 moves upwardly in FIG. 5 to enlarge the clearance area S, whereby the damping force is maintained at the upper limit.

Therefore, since an upper limit is given to the generation of the damping force to ensure that a damping force greater than the upper limit necessary for prevention of kick-back is not generated, it is possible to prevent the generation of a damping force at a level needlessly high for prevention of kick-back, and to make the appropriate strength required for the steering damper 10. Moreover, the upper limit restricting means can be constructed easily and inexpensively by simply adjusting the electromagnetic force, without providing an upper limit restricting means having a special mechanism.

In addition, in the case of the shown example in which the working liquid flows from the left liquid chamber 28 toward the side of the right liquid chamber 27, of the two systems of the bypass passage 33 as shown in FIG. 4, only the second passage 33b on one side is restricted by the second control valve 31b, while the first passage 33a on the other side is not restricted because the first control valve 31a is in a valve open condition. Therefore, the flow of the working liquid from the right liquid chamber 27 to the side of the left liquid chamber 28 through the first passage 33a occurs smoothly. At this time, the check valve in the first control valve 31a also permits this flow. Accordingly, it is possible not only to inhibit the turning of the front wheel steering system due to kick-back but also to permit a swift turning for returning the handle to a straight forward position.

The present invention is not limited to the above embodiments, and various modifications and applications are possible within the principle of the invention. For example, the steering damper to which the present invention is applied is not limited to the vane type comprising the oscillating partition wall as in the embodiment, but may be a cylinder system comprising a piston which advances and retracts.

In addition, the shape in section of the gap passage 46 is not limited to the annular shape, but may be a polygonal section as far as the clearance area S varies in ratio to the square in relation to the stroke amount of the valve body. The control valve 31 is not limited to a solenoid valve, and other known valves may be utilized. In that case, an upper limit restricting means is provided separately. It should be noted that the upper limit restricting means may not necessarily be required, and the manner of a quadric curve as shown in the damping force curve D1 may be adopted.

In addition, the damping force control may not necessarily be based on the steering speed, but may be based on any of various sensor quantities, such as steering angle, which are related to the magnitude of the kick-back.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper system in which a damping force is exerted on a front wheel steering system provided at a front portion of a vehicle body comprising:
   a control valve for providing a variable damping force, said control valve comprising:
      a valve body advancing and retracting in a passage for a working liquid, said valve body having a thickness varying uniformly along a longitudinal direction thereof, and advancing/retracting strokes of said valve body make a clearance area of a gap passage formed around said valve body variable, and
      said clearance area is varied nonlinearly in relation to variations in the advancing/retracting stroke of said valve body, whereby said damping force generated at said gap passage is increased in the manner of a quadric curve in relation to the variations in said stroke.

2. The steering damper system as set forth in claim 1, wherein the cross-sectional shape of said gap passage is annular.

3. The steering damper system as set forth in claim 1, wherein said control valve includes an upper limit restricting means for restricting the generation of said damping force to be not more than a predetermined upper limit.

4. The steering damper system as set forth in claim 3, wherein said control valve is a solenoid valve, and said upper limit restriction of said damping force is effected by an electromagnetic force of said solenoid valve.

5. The steering damper system as set forth in claim 1, wherein said steering damper includes a chamber with a vane disposed therein, said vane being moved in a first direction in relationship with a front wheel being moved in a first direction and said vane being moved in a second direction in relationship with the front wheel being moved in a second direction.

6. The steering damper system as set forth in claim 5, wherein said vane divides said chamber into a first section and a second section, a gap is provided between said vane and an inner wall of said chamber for providing communication of a fluid disposed within said chamber from either one of said first section to said second section and said second section to said first section.

7. The steering damper system as set forth in claim 6, wherein said steering damper system includes two control valves, a first control valve being operatively connected to said first section of said chamber and a second control valve being operatively connected to said second section of said chamber.

8. The steering damper system as set forth in claim 7, and further including a first flow rate sensor for sensing the flow of fluid from said first section of said chamber to said first control valve and a second flow rate sensor for sensing the flow of fluid from said second section of said chamber to said second control valve.

9. The steering damper system as set forth in claim 5, wherein said chamber is fan shaped.

10. The steering damper system as set forth in claim 1, and further including biasing means for normally biasing said valve body to an open position.

11. A steering damper system for generating a damping force to be exerted on a front wheel steering system of a vehicle body comprising:

a control valve for providing a variable damping force, said control valve comprising:
a valve passage;
a valve body advancing and retracting in said passage, said valve body having a thickness varying uniformly along a longitudinal direction thereof wherein advancing/retracting strokes of said valve body make a clearance area of a gap passage formed around said valve body variable, and
said clearance area is varied nonlinearly in relation to variations in the advancing/retracting stroke of said valve body, wherein said damping force generated at said gap passage is increased in the manner of a quadric curve in relation to the variations in said stroke.

12. The steering damper system as set forth in claim 11, wherein the cross-sectional shape of said gap passage is annular.

13. The steering damper system as set forth in claim 11, wherein said control valve includes an upper limit restricting means for restricting the generation of said damping force to be not more than a predetermined upper limit.

14. The steering damper system as set forth in claim 13, wherein said control valve is a solenoid valve, and said upper limit restriction of said damping force is effected by an electromagnetic force of said solenoid valve.

15. The steering damper system as set forth in claim 11, wherein said steering damper includes a chamber with a vane disposed therein, said vane being moved in a first direction in relationship with a front wheel being moved in a first direction and said vane being moved in a second direction in relationship with the front wheel being moved in a second direction.

16. The steering damper system as set forth in claim 15, wherein said vane divides said chamber into a first section and a second section, a gap is provided between said vane and an inner wall of said chamber for providing communication of a fluid disposed within said chamber from either one of said first section to said second section and said second section to said first section.

17. The steering damper system as set forth in claim 16, wherein said steering damper system includes two control valves, a first control valve being operatively connected to said first section of said chamber and a second control valve being operatively connected to said second section of said chamber.

18. The steering damper system as set forth in claim 17, and further including a first flow rate sensor for sensing the flow of fluid from said first section of said chamber to said first control valve and a second flow rate sensor for sensing the flow of fluid from said second section of said chamber to said second control valve.

19. The steering damper system as set forth in claim 15, wherein said chamber is fan shaped.

20. The steering damper system as set forth in claim 11, and further including biasing means for normally biasing said valve body to an open position.

* * * * *